(12) United States Patent
Fattal et al.

(10) Patent No.: US 10,725,226 B2
(45) Date of Patent: Jul. 28, 2020

(54) DUAL-DIRECTION COLLIMATOR

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 231 days.

(21) Appl. No.: 15/894,512

(22) Filed: Feb. 12, 2018

(65) Prior Publication Data

US 2018/0164489 A1    Jun. 14, 2018

Related U.S. Application Data

(63) Continuation of application No. PCT/US2015/056529, filed on Oct. 20, 2015.

(Continued)

(51) Int. Cl.
*F21V 8/00* (2006.01)
*G02B 5/18* (2006.01)
(Continued)

(52) U.S. Cl.
CPC ............ *G02B 6/0031* (2013.01); *G02B 5/18* (2013.01); *G02B 6/0023* (2013.01);
(Continued)

(58) Field of Classification Search
CPC .. G02B 6/0031; G02B 6/0023; G02B 6/0038; G02B 6/0046; G02B 6/0058;
(Continued)

(56) References Cited

U.S. PATENT DOCUMENTS 4,755,826 A    7/1988 Rao
4,784,700 A *  11/1988 Stern .................. F24S 23/80
                                                       136/248

(Continued)

FOREIGN PATENT DOCUMENTS

KR    20100030909 A    3/2010
TW       201213731 A    4/2012
WO    2014142851 A1    9/2014

OTHER PUBLICATIONS

International Search Report (ISR) from the International Searching Authority (ISA/KR) dated Jun. 3, 2016 (3 pages) for counterpart parent PCT Application No. PCT/US2015/056529.

*Primary Examiner* — Bryon T Gyllstrom
(74) *Attorney, Agent, or Firm* — J. Michael Johnson

(57) ABSTRACT

Dual-direction collimation and a dual-direction optical collimator provide dual-direction collimated light at a non-zero propagation angle. The dual-direction collimator includes a vertical collimator configured to collimate light in a vertical direction and a horizontal collimator configured to collimate the vertically collimated light in a horizontal direction. The horizontal collimator is located at an output of the vertical collimator. A three-dimensional (3D) display includes the dual-direction collimator, a plate light guide and an array of multibeam diffraction gratings at a surface of the plate light guide to couple out the dual-direction collimated light guided in the plate light guide as a plurality of light beams corresponding to different 3D view of the 3D electronic display.

24 Claims, 9 Drawing Sheets

Related U.S. Application Data

(60) Provisional application No. 62/214,978, filed on Sep. 5, 2015.

(51) Int. Cl.
    *G02B 19/00* (2006.01)
    *G02B 30/00* (2020.01)
    *G02B 27/30* (2006.01)

(52) U.S. Cl.
    CPC ......... *G02B 6/0038* (2013.01); *G02B 6/0046* (2013.01); *G02B 6/0058* (2013.01); *G02B 6/0068* (2013.01); *G02B 19/0023* (2013.01); *G02B 19/0047* (2013.01); *G02B 27/30* (2013.01); *G02B 30/00* (2020.01); *G02B 6/0078* (2013.01)

(58) Field of Classification Search
    CPC .... G02B 6/0068; G02B 5/18; G02B 19/0023; G02B 19/0047
    USPC .......................................................... 362/609
    See application file for complete search history.

(56) References Cited

U.S. PATENT DOCUMENTS

| | | | |
|---|---|---|---|
| 5,896,237 A * | 4/1999 | Blackmon, Jr. | G01J 1/04 250/216 |
| 2002/0149924 A1 * | 10/2002 | Falicoff | G02B 6/0035 362/19 |
| 2004/0240034 A1 * | 12/2004 | Scharf | G02B 5/18 359/293 |
| 2007/0211487 A1 | 9/2007 | Sormani | |
| 2008/0278460 A1 * | 11/2008 | Arnett | G02B 6/0045 345/175 |
| 2010/0220484 A1 * | 9/2010 | Shani | G02B 5/021 362/296.09 |
| 2010/0060817 A1 | 11/2010 | Park et al. | |
| 2011/0032214 A1 * | 2/2011 | Gruhlke | G02B 5/045 345/175 |
| 2011/0226332 A1 * | 9/2011 | Ford | G02B 6/0053 136/259 |
| 2011/0305014 A1 | 12/2011 | Peck | |
| 2013/0308339 A1 | 11/2013 | Woodgate et al. | |
| 2013/0314943 A1 | 11/2013 | Huang | |
| 2014/0268867 A1 | 9/2014 | Fiorentino et al. | |
| 2015/0036068 A1 | 2/2015 | Fattal et al. | |
| 2015/0055236 A1 * | 2/2015 | Citron | G02B 19/0042 359/853 |
| 2015/0277375 A1 * | 10/2015 | Large | G02B 6/0058 250/214 AL |
| 2015/0378085 A1 * | 12/2015 | Robinson | G02B 6/0048 359/464 |
| 2016/0299281 A1 * | 10/2016 | Robinson | G02B 6/0048 |
| 2016/0349444 A1 * | 12/2016 | Robinson | G02B 6/0055 |

* cited by examiner

DUAL-DIRECTION COLLIMATOR

CROSS-REFERENCE TO RELATED APPLICATIONS

This application is a continuation patent application of and claims the benefit of priority to International Application No. PCT/US2015/056529, filed Oct. 20, 2015, which claims priority from U.S. Provisional Patent Application Ser. No. 62/214,978, filed Sep. 5, 2015, the entirely of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the applicability limitations of passive displays associated with light emission, many passive displays are coupled to an external light source. The coupled light source may allow these otherwise passive displays to emit light and function substantially as an active display. Examples of such coupled light sources are backlights. Backlights are light sources (often so-called 'panel' light sources) that are placed behind an otherwise passive display to illuminate the passive display. For example, a backlight may be coupled to an LCD or an EP display. The backlight emits light that passes through the LCD or the EP display. The light emitted by the backlight is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments accordance with the principles described herein may be more readily understood with reference to the following detailed description taken in conjunction with the accompanying drawings, where like reference numerals designate like structural elements, and in which.

Figure 1:
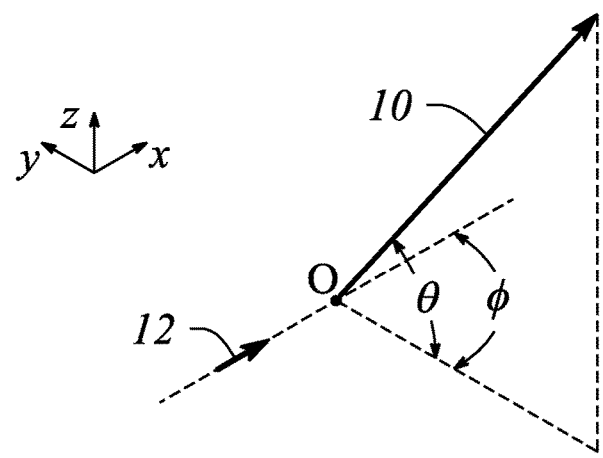
FIG. 1 illustrates a graphical view of angular components $\{\theta, \varphi\}$ of a light beam having a particular principal angular direction, according to an example of the principles describe herein.

Certain examples have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide dual-direction collimation and display backlighting using the dual-direction collimation. In particular, embodiments of the principles described herein provide dual-direction light collimation that includes collimating light separately in a vertical direction and in a horizontal direction. Moreover, in some embodiments, the light may be collimated in a vertical direction followed by the vertically collimated light being separately collimated in a horizontal direction. In addition, dual-direction collimation described herein provides dual-direction collimated light having a predetermined, non-zero propagation angle in a vertical plane corresponding to the vertical direction.

According to various embodiments, the dual-direction collimation is provided by a dual-direction collimator comprising a vertical collimator (e.g., vertical collimating reflector) coupled at an output to a horizontal collimator (e.g., horizontal collimating reflector). Light from a light source (e.g., a plurality of LEDs) may be coupled into the dual-direction collimator for dual-direction collimation. According to some embodiments, the dual-direction collimated light from the dual-direction collimator may be coupled into a light guide (e.g., a plate light guide) of a backlight used in an electronic display. For example, the backlight may be a grating-based backlight including, but not limited to, a grating-based backlight having a multibeam diffraction grating. In some embodiments, the electronic display may be a three-dimensional (3D) electronic display used to display 3D information, e.g., an autostereoscopic or 'glasses free' 3D electronic display.

In particular, a 3D electronic display may employ a grating-based backlight having an array of multibeam diffraction gratings. The multibeam diffraction gratings may be used to couple light from a light guide and to provide coupled-out light beams corresponding to pixels of the 3D electronic display. For example, the coupled-out light beams may have different principal angular directions (also referred to as 'the differently directed light beams') from one another. According to some embodiments, these differently directed light beams produced by the multibeam diffraction grating may be modulated and serve as 3D pixels corresponding to 3D views of the 'glasses free' 3D electronic display to display 3D information. In these embodiments, the dual-direction collimation provided by the dual-direction collimator may be used to produce output dual-direction collimated light that is substantially uniform (i.e., without striping) within the light guide. In turn, uniform illumination of the multibeam diffraction gratings may be provided, in accordance with the principles described herein.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

In particular, a light beam produced by the multibeam diffraction grating has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam, herein. By definition, the elevation angle $\theta$ is an angle in a vertical plane (e.g., perpendicular to a plane of the multibeam diffraction grating) while the azimuth angle $\theta$ is an angle in a horizontal plane (e.g., parallel to the multibeam diffraction grating plane). FIG. 1 illustrates the angular components $\{\theta, \varphi\}$ of a light beam 10 having a particular principal angular direction, according to an example of the principles describe herein. In addition, the light beam 10 is emitted or emanates from a particular point, by definition herein. That is, by definition, the light beam 10 has a central ray associated with a particular point of origin within the multibeam diffraction grating. FIG. 1 also illustrates the light beam point of origin O. An example propagation direction of incident light is illustrated in FIG. 1 using a bold arrow 12.

According to various embodiments, characteristics of the multibeam diffraction grating and features thereof, may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove or ridge width), and an orientation of the grating. In some examples, the various characteristics used for control may be characteristics that are local to a vicinity of the point of origin of a light beam.

According to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent '3D pixels' of the 3D electronic display. Further, the 3D pixels correspond to different 3D views or 3D view angles of the 3D electronic display.

Herein a 'collimating' reflector is defined as a reflector having a curved shape that is configured to collimate light reflected by the collimating reflector (e.g., a collimating mirror). For example, the collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). In some embodiments, the collimating reflector may be a continuous reflector (i.e., having a substantially smooth, continuous reflecting surface), while in other embodiments, the collimating reflector may comprise a Fresnel reflector or Fresnel mirror that provides light collimation. According to various embodiments, an amount of collimation provided by the collimating reflector may vary in a predetermined degree or amount from one embodiment to another. Further, the collimating reflector may be configured to provide collimation in one or both of two orthogonal directions (e.g., a vertical direction and a horizontal direction). That is, the collimating reflector may include a parabolic shape in one or both of two orthogonal directions, according to some embodiments.

Herein, a 'light source' is defined as a source of light (e.g., an apparatus or device that emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., produce a color of light that is different between the at least two light sources). Hence, by definition herein, a plurality of light sources of different colors may include a first light source that produces a first color of light and a second light source that produces a second color of light, where the second color differs from the first color.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
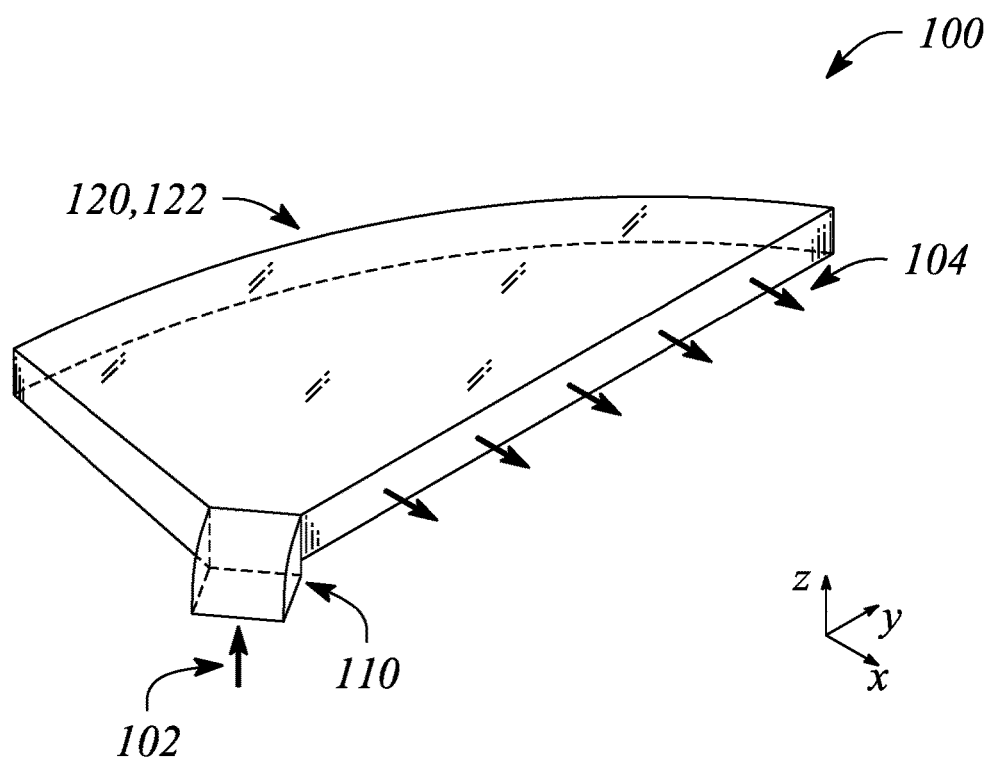
FIG. 2A illustrates a perspective view of a dual-direction optical collimator in an example, according to an embodiment of the principles described herein.
Figure 2B:
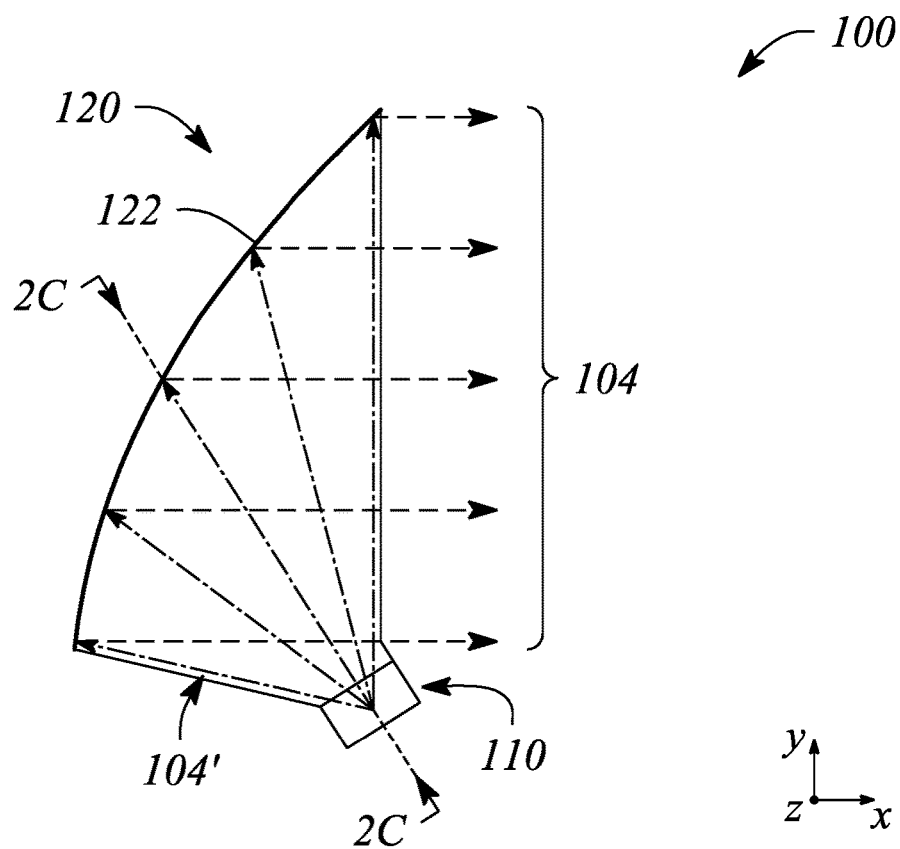
FIG. 2B illustrates a top view of a dual-direction optical collimator in an example, according to an embodiment of the principles described herein.
Figure 2C:
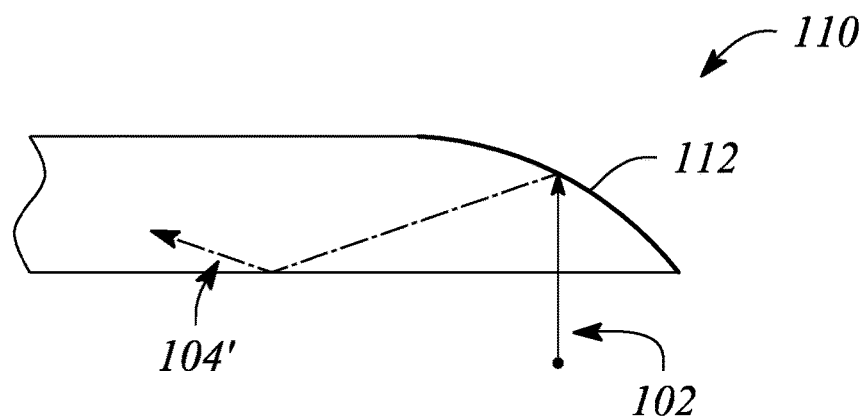
FIG. 2C illustrates a cross sectional view of the dual-direction optical collimator illustrated in FIG. 2B, according to an embodiment of the principles described herein.

According to some embodiments, a dual-direction optical collimator is provided. FIG. 2A illustrates a perspective view of a dual-direction optical collimator 100 in an example, according to an embodiment of the principles described herein. FIG. 2B illustrates a top view of a dual-direction optical collimator 100 in an example, according to an embodiment of the principles described herein. FIG. 2C illustrates a cross sectional view of a portion of the dual-direction optical collimator 100 illustrated in FIG. 2B, according to an embodiment of the principles described herein. In particular, the cross section illustrated in FIG. 2C is indicated in FIG. 2B. According to various embodiments, the dual-direction optical collimator 100 is configured to collimate received light in or with respect to at least two different directions.

In particular, as illustrated in FIGS. 2A and 2C, the dual-direction optical collimator 100 is configured to receive light 102. In some examples, the light 102 received by the dual-direction optical collimator 100 may be substantially uncollimated light. For example, the light 102 may be provided by and thus be received from a substantially uncollimated light source (not illustrated). In another example, the received light 102 may be partially collimated light (e.g., provided by a light source that includes a lens or using some other partial collimation means).

The dual-direction optical collimator 100 illustrated in FIGS. 2A-2C is configured to collimate the received light 102 and to provide collimated light 104 at an output of the dual-direction optical collimator 100 (e.g., an output port, an output plane, an output surface, etc.). The collimated light 104 provided at the dual-direction optical collimator output is collimated or at least substantially collimated in at least two directions, according to various embodiments. As such, the collimated light 104 may be referred to as 'dual-direction' collimated light 104.

In particular, the dual-direction collimated light 104 is collimated in two directions that are generally orthogonal to a propagation direction of the dual-direction collimated light 104, by definition herein. Further, by definition, the two collimation directions are mutually orthogonal to one another. For example, the dual-direction collimated light 104 may be collimated in or with respect to a horizontal direction (e.g., in an x-y plane) and also in or with respect to a vertical direction (e.g., a z-direction). Herein the dual-direction collimated light 104 provided by the dual-direction optical collimator 100 is referred to as being both horizontally collimated and vertically collimated or equivalently collimated in both a horizontal direction and vertical direction by way of example and not limitation (i.e., the horizontal and vertical directions may be determined relative to an arbitrary reference frame, for example).

Further according to various embodiments, the dual-direction optical collimator 100 is configured to provide the dual-direction collimated light 104 at a non-zero propagation angle at the dual-direction optical collimator output. For example, the non-zero propagation angle may be an angle relative to or defined with respect to a horizontal plane of the dual-direction optical collimator 100. As defined herein, the 'non-zero propagation angle' is an angle relative to a plane (e.g., the horizontal or x-y plane) or equivalently to a surface of a light guide, as described herein. In some examples, the non-zero propagation angle of the dual-direction collimated light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Further, according to some embodiments, the non-zero propagation angle is both greater than zero and less than a critical angle of total internal reflection within a light guide, as described below.

As illustrated in FIGS. 2A-2C, the dual-direction optical collimator 100 comprises a vertical collimator 110. The vertical collimator 110 is configured to collimate light in a vertical direction (i.e., in a z-direction). FIG. 2C illustrates a cross sectional view of the vertical collimator 110 in an example according to an embodiment of the principles herein. Further FIG. 2C illustrates the received light 102 as an arrow entering the vertical collimator 110, e.g., at an input of the vertical collimator 110. Light exiting the vertical collimator 110 as 'vertically' collimated light 104' after being collimated in the vertical direction is also illustrated in FIG. 2C as another arrow (i.e., dashed-line arrow in both FIGS. 2B-2C). According to various embodiments, the vertical collimator 110 may comprise any of a variety of collimator types including, but not limited to, a collimating optical reflector, a collimating lens and a diffraction grating configured to provide collimation.

In particular, as illustrated in FIG. 2C, the vertical collimator 110 may comprise an optical reflector 112 having a parabolic shape. The parabolic shape of the optical reflector 112 is configured to provide the vertical-direction collimation. In some embodiments, the parabolic shape of the optical reflector 112 may have a so-called 'purely' parabolic shape. In other embodiments, the parabolic shape of the optical reflector 112 may be adjusted, optimized or otherwise 'shaped' to enhance or tweak collimation characteristics of the optical reflector 112. For example, the parabolic shape of the optical reflector 112 may be tweaked as a shaped parabolic reflector to optimize vertical collimation of light 102 received from a light source that includes some directional distortion or partial (albeit non-ideal or undesirable) collimation. As such, the optical reflector 112 may be referred to as a 'shaped' parabolic reflector 112. Further, the shaped parabolic reflector 112 may be shaped or shape-optimized in both the vertical direction (e.g., to control or optimize vertical collimation) and the horizontal direction. For example, in addition to being shaped in the vertical direction, the shaped parabolic reflector 112 may be shape-optimized in the horizontal direction to determine or provide control of a distribution (e.g., a width or a spread) of the vertically collimated light 104' in the horizontal direction. Nevertheless, for ease of discussion herein, the optical reflector 112 of the vertical collimator 110 is generally referred to as having 'a parabolic shape,' whether the optical reflector 112 has a purely parabolic shape or is a shaped parabolic reflector 112, unless an explicit distinction is necessary for proper understanding.

Further, in some embodiments (e.g., as illustrated in FIG. 2C), the optical reflector 112 of the vertical collimator 110 may include a tilt angle (i.e., the optical reflector 112 may be tilted at the tilt angle). The tilt angle may be configured to provide a non-zero propagation angle of the vertically collimated light 104', and by extension, to provide the non-zero propagation angle (or at least a portion thereof) of the dual-direction collimated light 104. In other words, the optical reflector 112 itself may be tilted. In some examples, the tilt angle may be provided by a 'shaping' of the shaped parabolic reflector 112 instead of or in addition to an actual or physical tilting of the optical reflector 112 itself. In yet another example, the tilt angle may be provided by a shift in a location of the light source that provides the received light 102 relative to the focus of a parabola of the optical reflector 112. In addition, when another type of collimator (e.g., a collimating lens or a diffraction grating) is employed, the other collimator type may be 'tilted' to provide the tilt angle, according to various embodiments.

Figure 3:
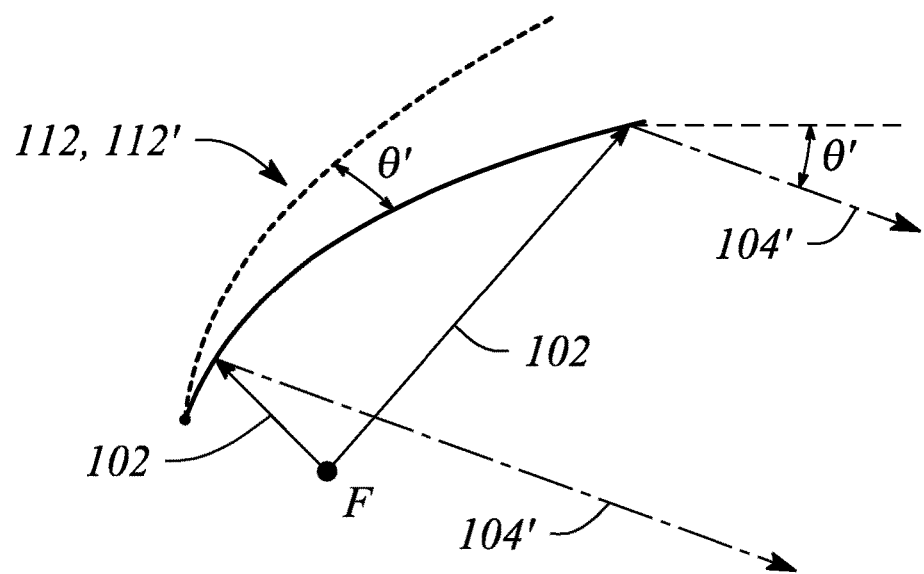
FIG. 3 illustrates a schematic representation of an optical reflector having a tilt in an example, according to an embodiment consistent with the principles described herein.

FIG. 3 illustrates a schematic representation of an optical reflector having a tilt in an example, according to an embodiment consistent with the principles described herein. In particular, as illustrated in FIG. 3, the optical reflector 112 is tilted downward at a tilt angle corresponding to or configured to provide vertically collimated light 104' having a non-zero propagation angle θ'. FIG. 3 also illustrates a dashed line representing a horizontal plane H from which the non-zero propagation angles θ' are defined. Further, FIG. 3 illustrates using another (e.g., bold) dashed line an example optical reflector 112' that is not tilted to show the tilt angle θ' of the tilted optical reflector 112. Note, as illustrated, the tilt angle θ' of the tilted optical reflector 112 and the non-zero propagation angle θ' are equal to one another, by example and not limitation. Light 102 received from a light source in a vicinity of a focus F of the optical reflector 112 is illustrated in FIG. 3 as a pair of diverging light rays (i.e., solid line arrows) incident on the optical reflector 112. Similarly, the vertically collimated light 104' exiting the optical reflector 112 is illustrated as a pair of rays (i.e., dashed line arrows) that are substantially parallel to one another. Further, the vertically collimated light rays 104' are illustrated having the non-zero propagation angle θ' provided by the optical reflector tilt angle.

Referring again to FIGS. 2A-2B, the dual-direction optical collimator 100 further comprises a horizontal collimator 120. The horizontal collimator 120 is configured to collimate light in the horizontal direction (i.e., in a x-y plane, as illustrated) that is substantially orthogonal to the vertical direction (i.e., z-direction, as illustrated). According to various embodiments, the horizontal collimator 120 is located to receive the vertically collimated light 104' from the vertical collimator 110. In particular, as illustrated in FIGS. 2A-2B, the horizontal collimator 120 is located adjacent to an output of the vertical collimator 110. The horizontal collimator 120 is configured to horizontally collimate the vertically collimated light 104' from the vertical collimator 110 to provide the dual-direction collimated light 104 at an output of the dual-direction optical collimator 100.

FIG. 2B illustrates a top view of the horizontal collimator 120 depicting the vertically collimated light 104' as light rays (i.e., as dashed line arrows) exiting the vertical collimator 110 and impinging on the horizontal collimator 120. Light exiting the horizontal collimator 120 as the dual-direction collimated light 104 (i.e., both horizontally and vertically collimated) is illustrated as a plurality of substantially parallel rays propagating away from the horizontal collimator 120. According to various embodiments, the horizontal collimator 120 may comprise any of a variety of collimator types including, but not limited to, a collimating optical reflector, a collimating lens and a diffraction grating configured to provide collimation.

In particular, as illustrated in FIGS. 2A and 2B, the horizontal collimator 120 may comprise an optical reflector 122 having a parabolic shape. The parabolic shape of the optical reflector 122 is configured to provide the horizontal-direction collimation. As with the optical reflector 112 of the vertical collimator 110, in some embodiments, the parabolic shape of the optical reflector 122 of the horizontal collimator 120 may have a so-called 'purely' parabolic shape. In other embodiments, the parabolic shape may be adjusted, optimized or otherwise 'shaped' to enhance or tweak collimation characteristics of the optical reflector 122. For example, the parabolic shape of the optical reflector 122 may be tweaked as a shaped parabolic reflector to optimize horizontal collimation of the vertically collimated light 104' received from the vertical collimator 110. In particular, the tweaked, shaped parabolic optical reflector 122 may be optimized to horizontally collimate some directional distortion or other non-ideal or undesirable collimation artifacts in the vertically collimated light 104'. As such, the optical reflector 122 of the horizontal collimator 120 may be referred to as a 'shaped' parabolic reflector 122. For ease of discussion herein, the optical reflector 122 of the horizontal collimator 120 is generally referred to as having 'a parabolic shape,' whether the optical reflector 122 has a purely parabolic shape or is a shaped parabolic reflector 122, unless an explicit distinction is necessary for proper understanding.

Further, in some embodiments (not illustrated), the optical reflector 122 of the horizontal collimator 120, may include a tilt angle. In some embodiments, the tilt angle may be configured to provide the non-zero propagation angle of the dual-direction collimated light 104. In other embodiments, the tilt angle may be configured to provide a portion of the non-zero propagation angle to augment a portion of the non-zero propagation angle provided by the vertical collimator 110. In other words, the optical reflector 122 itself or equivalently a parabolic shape of the optical reflector 122, may be tilted. In some examples, the tilt angle may be provided by a 'shaping' of the shaped parabolic reflector 122 instead of or in addition to an actual or physical tilting of the optical reflector 122. In yet another example, the tilt angle may be provided by a shift in a location of the vertical collimator 110 relative to the focus of a parabola of the optical reflector 122 of the horizontal collimator 120. In addition, when another type of collimator (e.g., a collimating lens or a diffraction grating) is employed, the other collimator type may be 'tilted' to provide the tilt angle, according to various embodiments.

As illustrated in FIGS. 2A and 2B, the optical reflector 122 of the horizontal collimator 120 may be configured to substantially span an output aperture of the dual-direction optical collimator 100. In some embodiments, the horizontal collimator 120 is configured to provide the dual-direction collimated light 104 having a substantially uniform distribution across the output aperture. In particular, the optical reflector 122 may span the output aperture to provide the substantially uniform distribution of the dual-direction collimated light 104.

In some embodiments, the optical reflector 122 of the horizontal collimator 120 may comprise a plurality of sub-reflectors 122'. In particular, the sub-reflectors 122' may be configured in combination to substantially span the output aperture of the dual-direction optical collimator 100. According to various embodiments, each sub-reflector 122' may comprise a parabolic-shaped reflective surface. For example, the optical reflector 122 may be a Fresnel reflector.

Figure 4A:
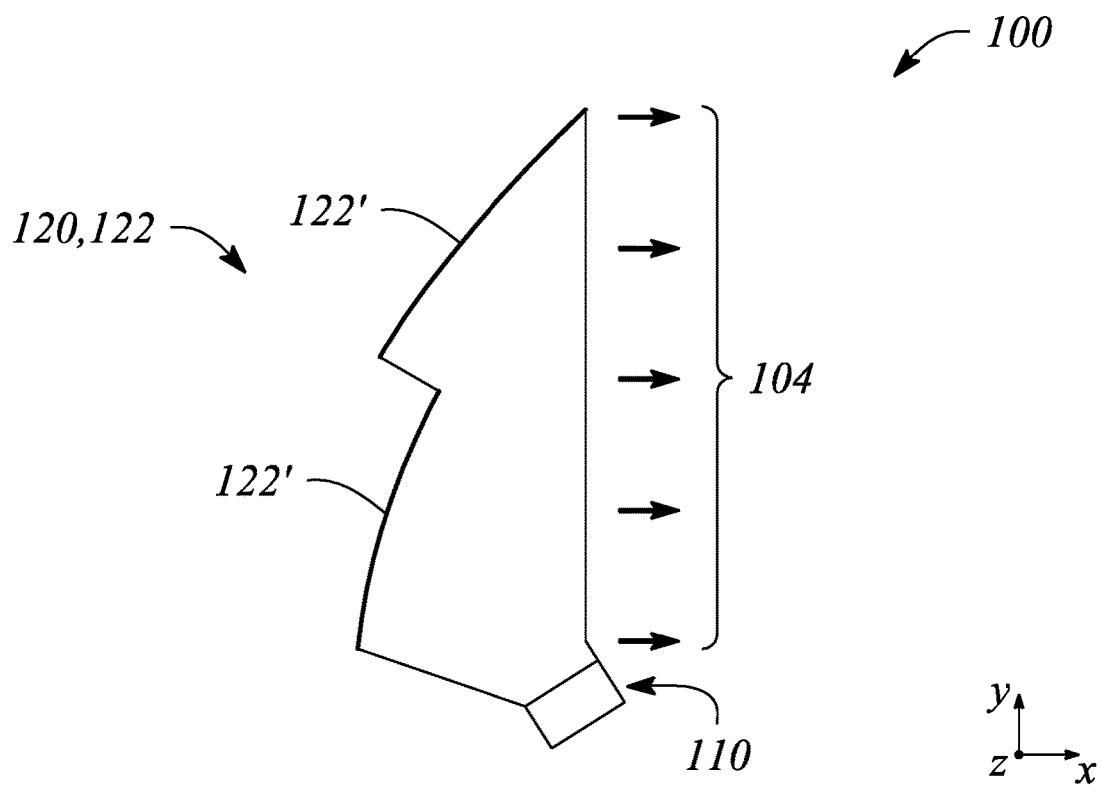
FIG. 4A illustrates a top view of a dual-direction optical collimator in an example, according to an embodiment consistent with the principles described herein.

FIG. 4A illustrates a top view of a dual-direction optical collimator 100 in an example, according to an embodiment consistent with the principles described herein. In particular, FIG. 4A illustrates the optical reflector 122 of the horizontal collimator 120 as a Fresnel reflector having a plurality of sub-reflectors 122'. The vertical collimator 110 is illustrated in FIG. 4A along with the dual-direction collimated light 104.

Figure 4B:
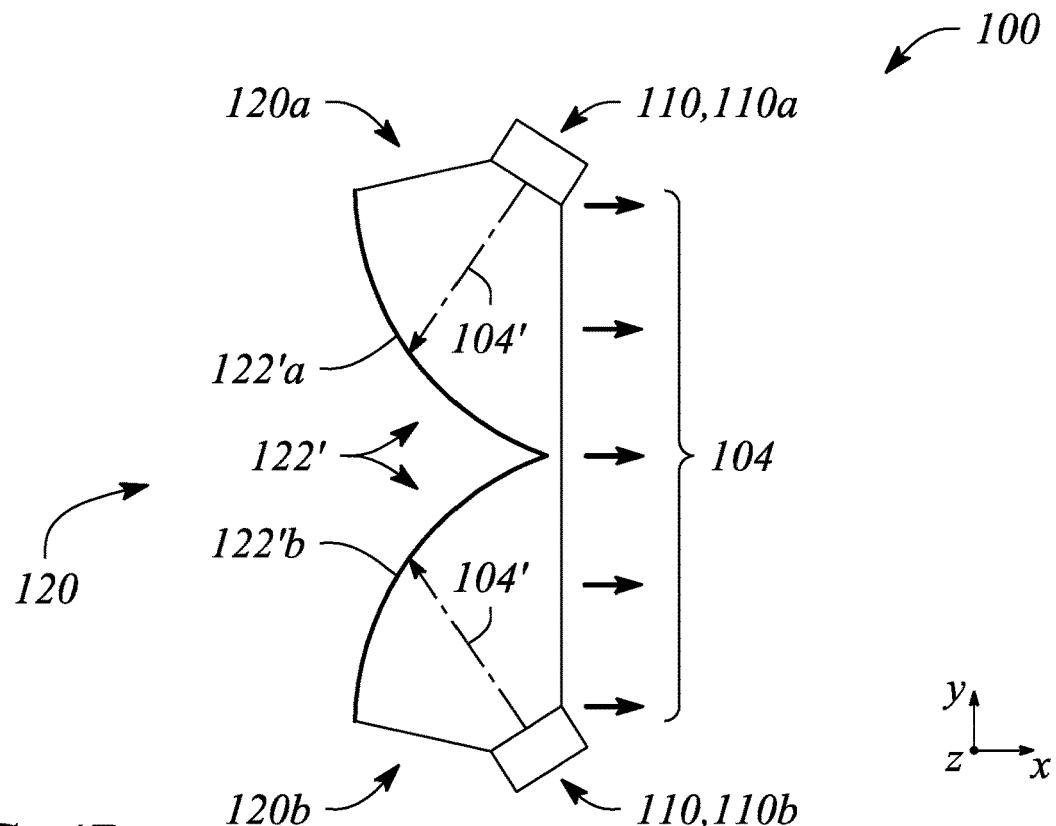
FIG. 4B illustrates a top view of a dual-direction optical collimator in an example, according to another embodiment consistent with the principles described herein.

FIG. 4B illustrates a top view of a dual-direction optical collimator 100 in an example, according to another embodiment consistent with the principles described herein. In particular, FIG. 4B illustrates the dual-direction optical collimator 100 comprising a horizontal collimator 120 having a plurality of sub-reflectors 122' along with a plurality of vertical collimators 110. As illustrated in FIG. 4B, a first sub-reflector 122'a of the horizontal collimator sub-reflector plurality is configured to receive vertically collimated light 104' from a first vertical collimator 110a of the vertical collimator plurality located at a first edge 120a of the horizontal collimator 120. Further, a second sub-reflector 122'b of the horizontal collimator sub-reflector plurality is configured to receive the vertically collimated light 104' from a second vertical collimator 110b of the vertical collimator plurality located at a second edge 120b of the horizontal collimator 120. The second edge 120b is opposite to the first edge 120a in the horizontal plane corresponding to the horizontal direction, as illustrated. Also illustrated in FIG. 4B, example rays of the dual-direction collimated light 104 are illustrated exiting the output aperture of the dual-direction optical collimator 100.

Figure 4C:
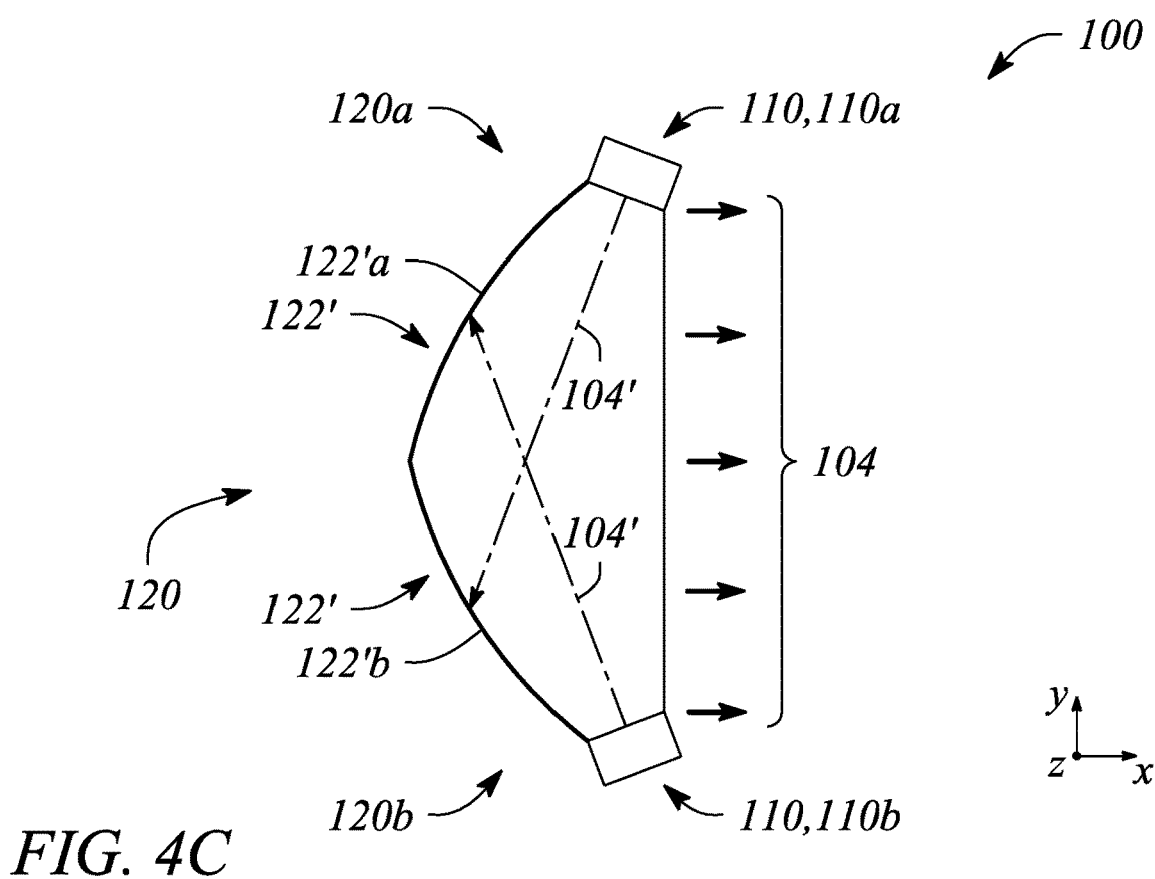
FIG. 4C illustrates a top view of a dual-direction optical collimator in an example, according to yet another embodiment consistent with the principles described herein.

FIG. 4C illustrates a top view of a dual-direction optical collimator 100 in an example, according to yet another embodiment consistent with the principles described herein. In particular, FIG. 4C illustrates the dual-direction optical collimator 100 comprising a horizontal collimator 120 having a plurality of sub-reflectors 122' along with a plurality of vertical collimators 110. As illustrated in FIG. 4C, a first sub-reflector 122'a of the sub-reflector plurality is configured to receive vertically collimated light 104' from a second vertical collimator 110b of the vertical collimator plurality that is located at a second edge 120b of the horizontal collimator 120 opposite to the first sub-reflector 122'a. Further, a second sub-reflector 122'b of the sub-reflector plurality is configured to receive vertically collimated light 104' from a first vertical collimator 110a of the vertical collimator plurality that is located at the first edge 120a opposite to the second sub-reflector 122'b, as illustrated in FIG. 4C. In other words, the sub-reflectors 122'a, 122'b in FIG. 4C are configured to receive the vertically collimated light 104' from respective opposite edges of the horizontal collimator 120, as compared to the dual-direction optical collimator 100 illustrated in FIG. 4B. Moreover, the dual-direction optical collimator 100 of FIG. 4C is configured to provide the dual-direction collimated light 104 to the output aperture of the dual-direction optical collimator 100, as further illustrated in FIG. 4C.

Although not explicitly illustrated, the dual-direction optical collimator 100 may include a sub-reflector plurality having more than two sub-reflectors 122'. Similarly, the vertical collimator 110 may comprise a plurality of vertical collimators 110 that includes more than two individual vertical collimators 110. For example, each of the two sub-reflectors 122', 122'a, 122'b of FIGS. 4A-4C may be further divided into two or more sub-reflectors (e.g., a plurality of sub-sub-reflectors). Further, the plurality of vertical collimators 110 including more than two individual vertical collimators 110 may be used to provide vertically collimated light 104' to the more than two sub-reflectors (e.g., one vertical collimator for each sub-sub-reflector). Moreover, different vertical collimators 110 may be employed for different colors of received light 102 to provide different colors of vertically collimated light 104' to the optical reflector 122 (i.e., including sub-reflectors 122') of the horizontal collimator 120.

In particular, any of a number of different sub-reflector/vertical collimator configurations may be employed without departing from the scope of the principles described herein. Moreover, the use of various different sub-reflector/vertical collimator configurations may facilitate scanning of the dual-direction collimated light 104 across the output aperture as well as may provide increased brightness (e.g., using multiple light sources) of the dual-direction collimated light 104, according to some embodiments.

In some embodiments, one or both of the vertical collimator 110 and the horizontal collimator 120 may comprise a substantially optically transparent material. In addition, portions of the dual-direction optical collimator 100 between the vertical collimator 110 and the horizontal collimator 120 as well as between the horizontal collimator 120 and the output aperture of the dual-direction optical collimator 100 may comprise the substantially optically transparent material, in some embodiments. The optically transparent material may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). For example, one or both of the vertical collimator 110 and the horizontal collimator 120 may comprise an optically transparent material formed to have parabolic-shaped surface. The parabolic-shaped surface, in turn, may be metalized or otherwise coated with a reflective material to provide the optical reflectors 112, 122, for example. Reflective materials used to coat the parabolic-shaped surface(s) may include, but are not limited to, aluminum, chromium, nickel, silver and gold, for example. Further, the vertical collimator 110 may be integral to and comprise a material of the horizontal collimator 120, according to some embodiments. FIG. 2A illustrates by way of example and not limitation the dual-direction optical collimator 100 having integral vertical and horizontal collimators 110, 120 formed from a common, optically transparent material.

In some embodiments, the material of the dual-direction optical collimator 100 may serve as a light guide to guide light by total internal reflection. The light guide may guide light between the vertical collimator 110 and the horizontal collimator 120, according to some embodiments. FIG. 2C illustrates vertically collimated light 104' being reflected at an interface between the material of the dual-direction optical collimator 100 adjacent to the vertical collimator 110 and another material (e.g., air) outside of the material using total internal reflection. The illustrated reflection represents guiding of the vertically collimated light 104' within a portion of the dual-direction optical collimator 100 illustrated in FIG. 2C from the optical reflector 112 of the vertical collimator 110 in a direction toward the horizontal collimator 120 (not shown in FIG. 2C). In some embodiments (e.g., as illustrated in FIG. 2A), the material also may extend from the horizontal collimator 120 (e.g., the optical reflector 122)

to the output aperture. The material is configured as a light guide to guide the vertically collimated light 104' and the dual-direction collimated light 104 to the output aperture.

Figure 5A:
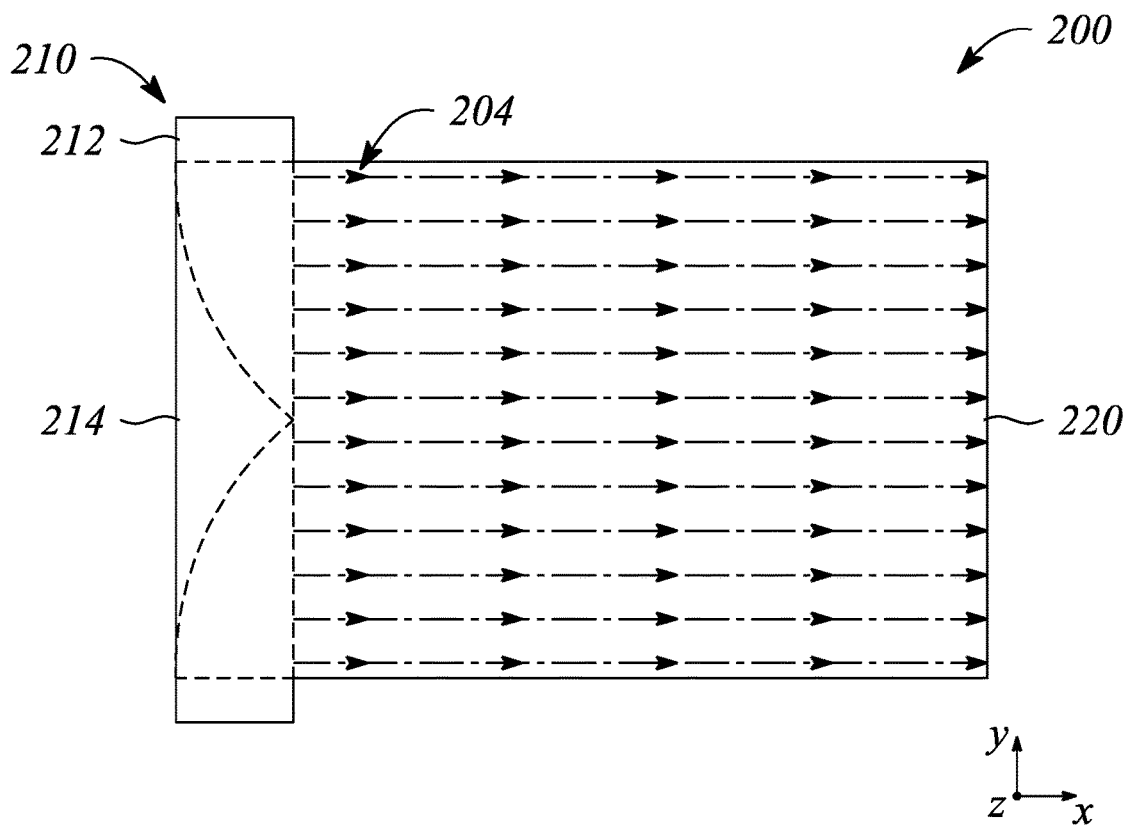
FIG. 5A illustrates a top view of a backlight in an example, according to an embodiment consistent with the principles of the principles described herein.
Figure 5B:
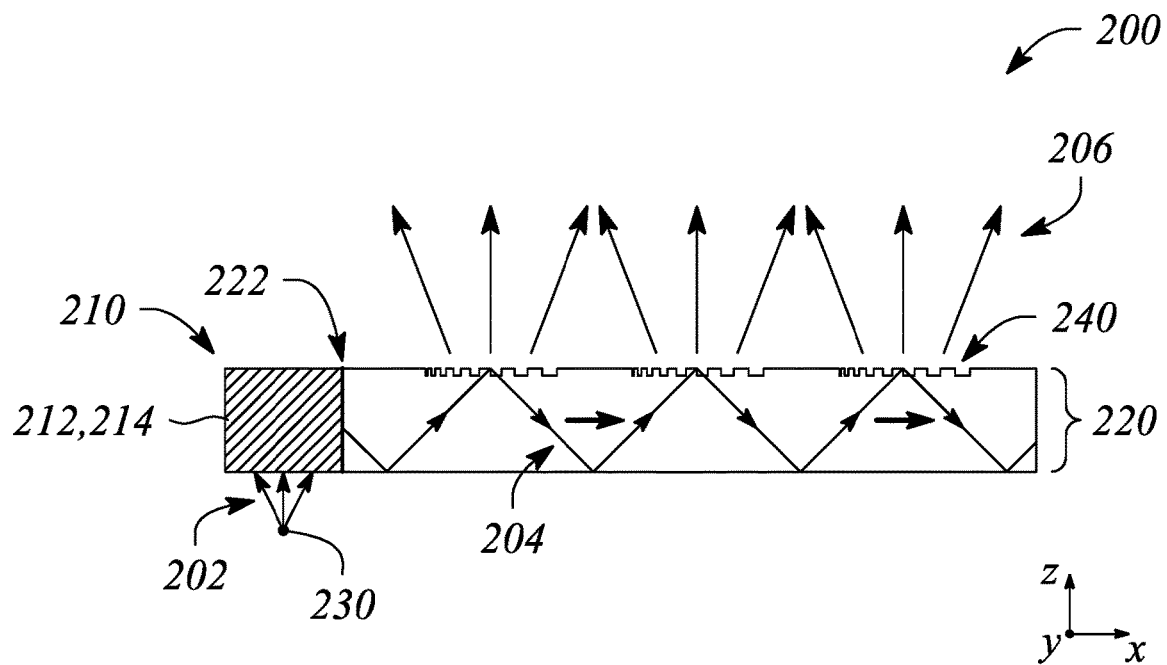
FIG. 5B illustrates a cross sectional view of a backlight in an example, according to an embodiment consistent with the principles of the principles described herein.

According to some embodiments of the principles described herein, a backlight employing dual-direction collimation is provided. FIG. 5A illustrates a top view of a backlight 200 in an example, according to an embodiment consistent with the principles of the principles described herein. FIG. 5B illustrates a cross sectional view of a backlight 200 in an example, according to an embodiment consistent with the principles of the principles described herein. As illustrated in FIGS. 5A-5B, the backlight 200 comprises a dual-direction optical collimator 210.

In some embodiments, the dual-direction optical collimator 210 may be substantially similar to the dual-direction optical collimator 100 described above. In particular, the dual-direction optical collimator 210 comprises a vertical collimator 212 and a horizontal collimator 214 each of which may be substantially similar to respective ones of the vertical collimator 110 and the horizontal collimator 120 of the dual-direction optical collimator 100. For example, dashed outlines associated with the dual-direction optical collimator 210 in FIG. 5A may resemble the dual-direction optical collimator 100 illustrated in FIG. 4B. According to various embodiments, the dual-direction optical collimator 210 is configured to receive light 202, illustrated in FIG. 5B (e.g., from a light source 230, described below), and provide dual-direction collimated light 204 at an output of the dual-direction optical collimator 210. Further, the dual-direction collimated light 204 is provided having a non-zero propagation angle relative to the horizontal x-y plane.

As illustrated in FIGS. 5A-5B, the backlight 200 further comprises a plate light guide 220 coupled (e.g., optically coupled) to the output of the dual-direction optical collimator 210. The plate light guide 220 is configured to receive and to guide the dual-direction collimated light 204 at the non-zero propagation angle, as illustrated in FIG. 5B. According to various embodiments, the plate light guide 220 is further configured to emit a portion of the guided, dual-direction collimated light 204 from a surface of the plate light guide 220. In FIG. 5B, emitted light 206 is illustrated as a plurality of rays (arrows) extending away from the plate light guide surface.

In some embodiment, the plate light guide 220 may be a slab or plate optical waveguide comprising an extended, planar sheet of substantially optically transparent, dielectric material. The planar sheet of dielectric material is configured to guide the dual-direction collimated light 204 from the dual-direction optical collimator 210 as a guided light beam 204 using total internal reflection. The dielectric material may have a first refractive index that is greater than a second refractive index of a medium surrounding the dielectric optical waveguide. The difference in refractive indices is configured to facilitate total internal reflection of the guided light beam 204 according to one or more guided modes of the plate light guide 220, for example.

According to various examples, the substantially optically transparent material of the plate light guide 220 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 220 may further include a cladding layer on at least a portion of a surface (e.g., one or both of the top surface and the bottom surface) of the plate light guide 220 (not illustrated). The cladding layer may be used to further facilitate total internal reflection, according to some examples.

In some embodiments, (e.g., as illustrated in FIG. 5A), the plate light guide 220 may be integral to the dual-direction optical collimator 210. In particular, the plate light guide 220 and the dual-direction optical collimator 210 may be formed from and thus comprise the same material. For example, the plate light guide 220 may be an extension of a light guide extending or connecting between a horizontal collimator and an output aperture of the dual-direction optical collimator 210. In other embodiments (e.g., as illustrated in FIG. 5B), the dual-direction optical collimator 210 and the plate light guide 220 are separate and coupling (e.g., one or both of optical coupling and mechanical coupling) thereof is provided by a glue or adhesive layer, another interface material or even air between the output aperture and an input of the plate light guide 220. For example, the dual-direction optical collimator 210 may comprise a polymer or plastic material and the plate light guide 220 may comprise glass. The dual-direction optical collimator 210 and the plate light guide 220 may be affixed to one another using a suitable adhesive layer 222 (e.g., an optically matched glue), for example as illustrated in FIG. 5B.

According to some embodiments, the backlight 200 may further comprise a light source 230. The light source 230 is configured to provide light to the dual-direction optical collimator 210. In particular, the light source 230 is located adjacent to (e.g., below, as illustrated in FIG. 5B) the vertical collimator 212 of the dual-direction optical collimator 210 and is configured to provide the light 202 to an input of the vertical collimator 212 as the received light 202. In various embodiments, the light source 230 may comprise substantially any source of light including, but not limited to, one or more light emitting diodes (LEDs). In some examples, the light source 230 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model).

In some embodiments, the light source 230 may comprise a plurality of different optical sources configured to provide different colors of light (i.e., 'different color' optical sources). The different optical sources may be offset from one another, for example. The offset of the different optical sources may be configured to provide different, color-specific, non-zero propagation angles of the dual-direction collimated light 204 corresponding to each of the different colors of light, according to some embodiments. In particular, the offset may add an additional non-zero propagation angle component to the non-zero propagation angle provided by the dual-direction collimator 210, for example.

Figure 5C:
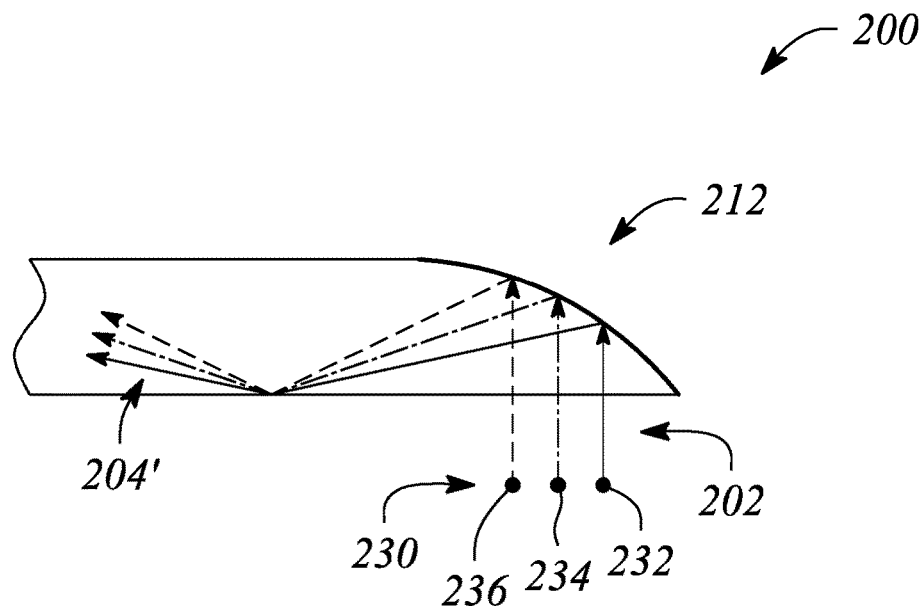
FIG. 5C illustrates a cross sectional view of a portion of a backlight in an example, according to an embodiment consistent with the principles described herein.

FIG. 5C illustrates a cross sectional view of a portion of a backlight 200 in an example, according to an embodiment consistent with the principles of the principles described herein. For example, the portion of the backlight 200 illustrated in FIG. 5C may be substantially similar to the dual-direction collimator portion illustrated in FIG. 2C. In particular, FIG. 5C illustrates a portion of the backlight 200 that includes the vertical collimator 212 along with the light source 230 comprising a plurality of different optical sources. As illustrated in FIG. 5C, the plurality of different optical sources of the light source 230 includes a first optical source 232 configured to provide light of a first color (e.g., red light), a second optical source 234 configured to provide light of a second color (e.g., green), and a third optical source 236 configured to provide light of a third color (e.g., blue). For the example, the first, second and third optical sources 232, 234, 236 of the light source 230 may respectively comprise a red LED, a green LED and a blue LED. Each of the different optical sources 232, 234 and 236 of the light source 230 is offset from one another, as illustrated.

Specifically, the different optical sources 232, 234 and 236 are illustrated in FIG. 5C as being laterally offset from one another in a propagation direction of the vertical collimated light 204'. The offset, in turn, results in the light 202 produced by the different optical sources 232, 234 and 236 having different, non-zero propagation angles upon exiting the vertical collimator 212 as vertically collimated light 204'. Since each of the illustrated optical sources 232, 234 and 236 produces light of a different color, the vertically collimated light 204' comprises three different light beams, each light beam having a different, color-specific, non-zero propagation angle, as illustrated in FIG. 5C. Note, in FIG. 5C, different line types (e.g., dashed, solid, etc.) indicate the different colors of light 202, 204'.

According to some embodiments (e.g., as illustrated in FIG. 5B), the backlight 200 may further comprise a multibeam diffraction grating 240 at a surface of the plate light guide 220. The multibeam diffraction grating 240 is configured to diffractively couple out a portion of the guided, dual-direction collimated light 204 from the plate light guide 220 as a plurality of light beams 206. The plurality of light beams 206 (i.e., the plurality of rays (arrows) illustrated in FIG. 5B) represents the emitted light 206. In various embodiments, a light beam 206 of the light beam plurality has a principal angular direction that is different from principal angular directions of other light beams 206 of the light beam plurality.

In some embodiments, the multibeam diffraction grating 240 is a member of or is arranged in an array of multibeam diffraction gratings 240. In some embodiments, the backlight 200 is a backlight of a three-dimensional (3D) electronic display and the principal angular direction of the light beam 206 corresponds to a view direction of the 3D electronic display.

Figure 6A:
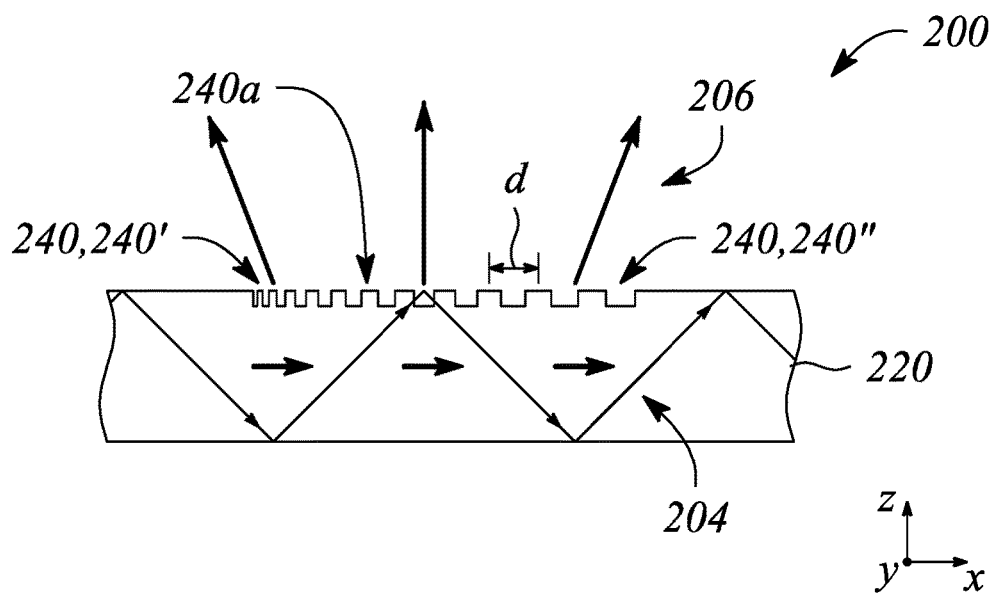
FIG. 6A illustrates a cross sectional view of a portion of a backlight with a multibeam diffraction grating in an example, according to an embodiment consistent with the principles described herein.
Figure 6B:
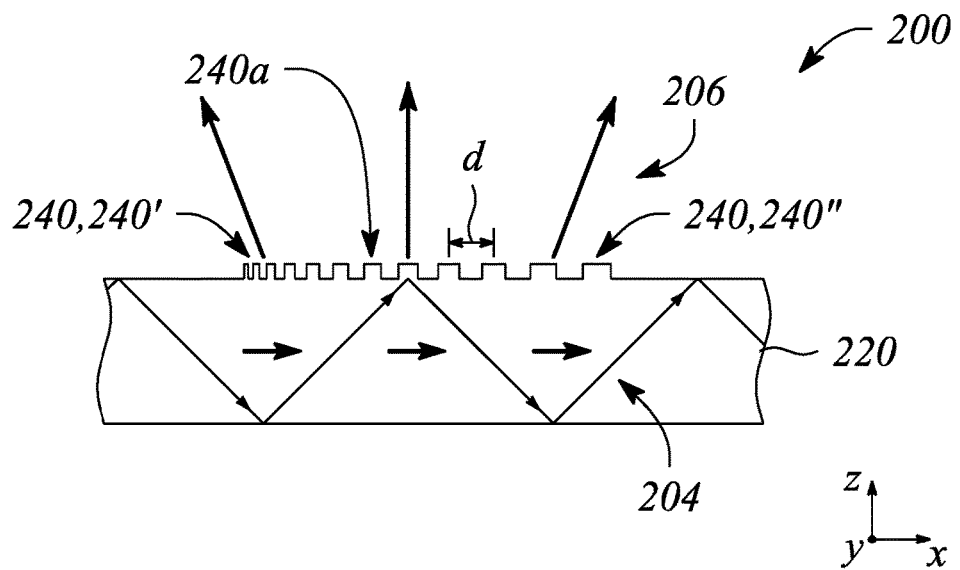
FIG. 6B illustrates a cross sectional view of a portion of a backlight with a multibeam diffraction grating in an example, according to another embodiment consistent with the principles described herein.
Figure 6C:
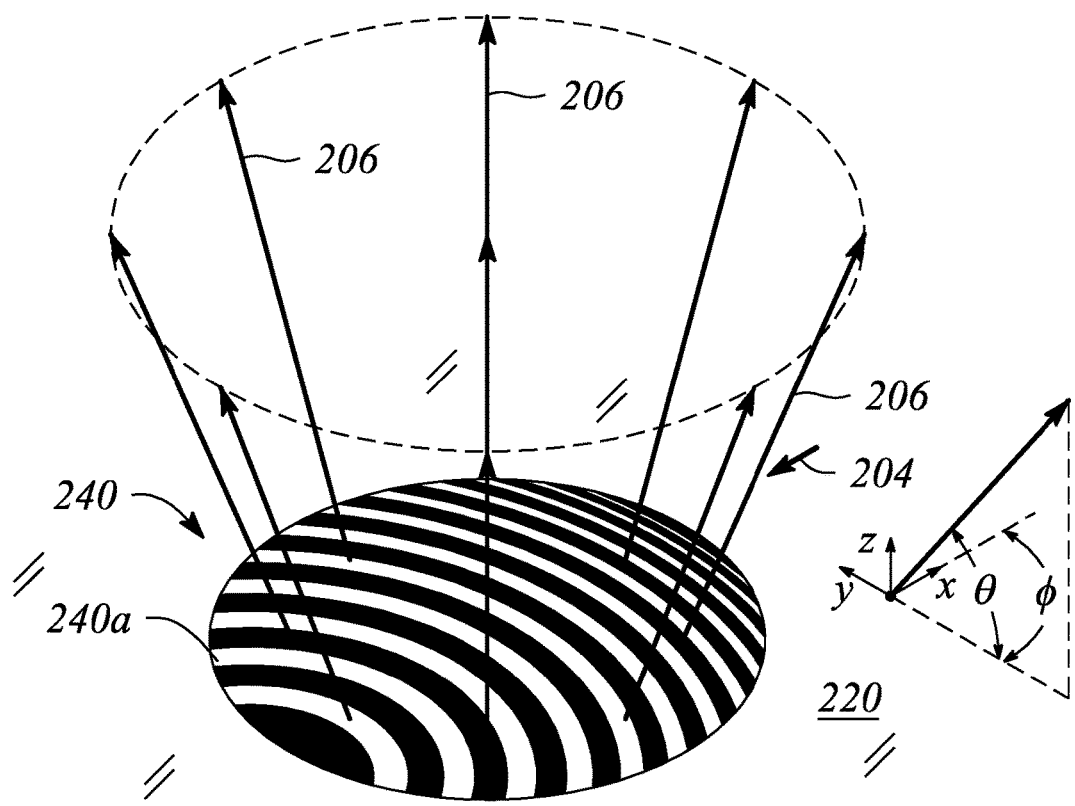
FIG. 6C illustrates a perspective view of the backlight portion of either FIG. 6A or FIG. 6B including the multibeam diffraction grating in an example, according to an embodiment consistent with the principles described herein.

FIG. 6A illustrates a cross sectional view of a portion of a backlight 200 with a multibeam diffraction grating 240 in an example, according to an embodiment consistent with the principles described herein. FIG. 6B illustrates a cross sectional view of a portion of a backlight 200 with a multibeam diffraction grating 240 in an example, according to another embodiment consistent with the principles described herein. FIG. 6C illustrates a perspective view of the backlight portion of either FIG. 6A or FIG. 6B including the multibeam diffraction grating 240 in an example, according to an embodiment consistent with the principles described herein. The multibeam diffraction grating 240 illustrated in FIG. 6A comprises grooves in a surface of the plate light guide 220, by way of example and not limitation. FIG. 6B illustrates the multibeam diffraction grating 240 comprising ridges protruding from the plate light guide surface.

As illustrated in FIGS. 6A-6B, the multibeam diffraction grating 240 is a chirped diffraction grating. In particular, the diffractive features 240a are closer together at a first end 240' of the multibeam diffraction grating 240 than at a second end 240". Further, the diffractive spacing d of the illustrated diffractive features 240a varies from the first end 240' to the second end 240". In some embodiments, the chirped diffraction grating of the multibeam diffraction grating 240 may have or exhibit a chirp of the diffractive spacing d that varies linearly with distance. As such, the chirped diffraction grating of the multibeam diffraction grating 240 may be referred to as a 'linearly chirped' diffraction grating.

In another embodiment, the chirped diffraction grating of the multibeam diffraction grating 240 may exhibit a non-linear chirp of the diffractive spacing d. Various non-linear chirps that may be used to realize the chirped diffraction grating include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used in the multibeam diffraction grating 240.

As illustrated in FIG. 6C, the multibeam diffraction grating 240 includes diffractive features 240a (e.g., grooves or ridges) in, at or on a surface of the plate light guide 220 that are both chirped and curved (i.e., the multibeam diffraction grating 240 is a curved, chirped diffraction grating, as illustrated). The guided light beam 204 guided in the plate light guide 220 has an incident direction relative to the multibeam diffraction grating 240 and the plate light guide 220, as illustrated by a bold arrow in FIGS. 6A-6C. Also illustrated is the plurality of coupled-out or emitted light beams 206 pointing away from the multibeam diffraction grating 240 at the surface of the plate light guide 220. The illustrated light beams 206 are emitted in a plurality of different predetermined principal angular directions. In particular, the different predetermined principal angular directions of the emitted light beams 206 are different in both azimuth and elevation (e.g., to form a light field).

According to various examples, both the predefined chirp of the diffractive features 240a and the curve of the diffractive features 240a may be responsible for a respective plurality of different predetermined principal angular directions of the emitted light beams 206. For example, due to the diffractive feature curve, the diffractive features 240a within the multibeam diffraction grating 240 may have varying orientations relative to an incident direction of the guided light beam 204 within the plate light guide 220. In particular, an orientation of the diffractive features 240a at a first point or location within the multibeam diffraction grating 240 may differ from an orientation of the diffractive features 240a at another point or location relative to the guided light beam incident direction. With respect to the coupled-out or emitted light beam 206, an azimuthal component of the principal angular direction $\{\theta, \varphi\}$ of the light beam 206 may be determined by or correspond to the azimuthal orientation angle $\varphi_f$ of the diffractive features 240a at a point of origin of the light beam 206 (i.e., at a point where the incident guided light beam 204 is coupled out). As such, the varying orientations of the diffractive features 240a within the multibeam diffraction grating 240 produce different light beams 206 having different principal angular directions $\{\theta, \varphi\}$, at least in terms of their respective azimuthal components $\varphi$.

In particular, at different points along the curve of the diffractive features 240a, an 'underlying diffraction grating' of the multibeam diffraction grating 240 associated with the curved diffractive features 240a has different azimuthal orientation angles $\varphi_f$. By 'underlying diffraction grating', it is meant that diffraction gratings of a plurality of non-curved diffraction gratings in superposition yield the curved diffractive features 240a of the multibeam diffraction grating 240. Thus, at a given point along the curved diffractive features 240a, the curve has a particular azimuthal orientation angle $\varphi_f$ that generally differs from the azimuthal orientation angle $\varphi_f$ at another point along the curved diffractive features 240a. Further, the particular azimuthal orientation angle $\varphi_f$ results in a corresponding azimuthal component of a principal angular direction $\{\theta, \varphi\}$ of a light beam 206 emitted from the given point. In some examples, the curve of the diffractive features 240a (e.g., grooves, ridges, etc.) may represent a section of a circle. The circle may be coplanar with the light guide surface. In other examples, the curve may represent a section of an ellipse or another curved shape, e.g., that is coplanar with the plate light guide surface.

In other embodiments, the multibeam diffraction grating 240 may include diffractive features 240a that are 'piecewise' curved. In particular, while the diffractive feature 240a may not describe a substantially smooth or continuous curve per se, at different points along the diffractive feature 240a within the multibeam diffraction grating 240, the diffractive feature 240a still may be oriented at different angles with respect to the incident direction of the guided light beam 204. For example, the diffractive feature 240a may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 240a may merely have different orientations relative to the incident direction of the guided light at different locations within the multibeam diffraction grating 240 without approximating a particular curve (e.g., a circle or an ellipse).

In some embodiments, the grooves or ridges that form the diffractive features 240a may be etched, milled or molded into the plate light guide surface. As such, a material of the multibeam diffraction gratings 240 may include the material of the plate light guide 220. As illustrated in FIG. 6B, for example, the multibeam diffraction grating 240 includes ridges that protrude from the surface of the plate light guide 220, wherein the ridges may be substantially parallel to one another. In FIG. 6A (and FIG. 5B), the multibeam diffraction grating 240 includes grooves that penetrate the surface of the plate light guide 220, wherein the grooves may be substantially parallel to one another. In other examples (not illustrated), the multibeam diffraction grating 240 may comprise a film or layer applied or affixed to the light guide surface. The plurality of light beams 206 in different principal angular directions provided by the multibeam diffraction gratings 240 are configured to form a light field in a viewing direction of an electronic display. In particular, the backlight 200 employing dual-direction collimation is configured to provide information, e.g., 3D information, corresponding to pixels of an electronic display.

Figure 7:
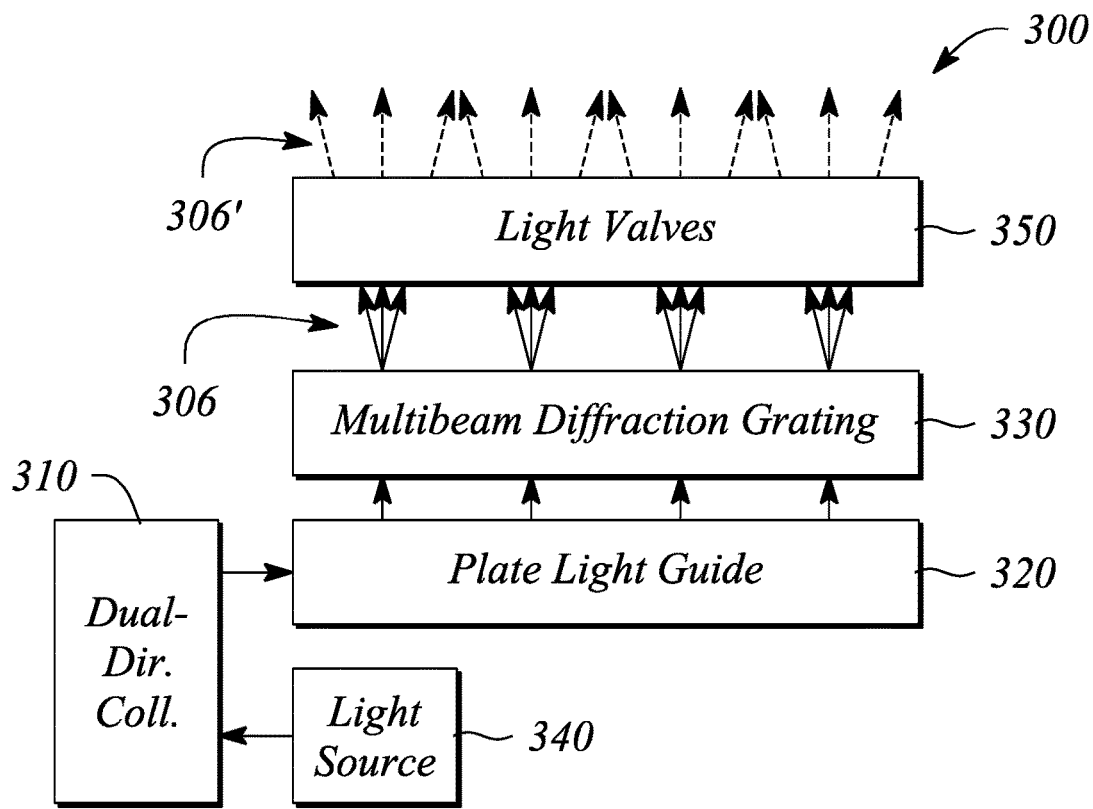
FIG. 7 illustrates a block diagram of a three-dimensional (3D) electronic display in an example, according to an embodiment of the principles described herein.

In accordance with some embodiments of the principles described herein, a three-dimensional (3D) electronic display is provided. FIG. 7 illustrates a block diagram of a three-dimensional (3D) electronic display 300 in an example, according to an embodiment of the principles described herein. According to various embodiments, the 3D electronic display 300 is configured to produce modulated, directional light comprising light beams having different principal angular directions and, in some embodiments, also having a plurality of different colors. For example, the 3D electronic display 300 may provide or generate a plurality of different light beams 306 directed out and away from the 3D electronic display 300 in different predetermined principal angular directions (e.g., as a light field). Further, the different light beams 306 may include light beams 306 of or having different colors of light. In turn, the light beams 306 of the plurality may be modulated as modulated light beams 306' to facilitate the display of information including color information (e.g., when the light beams 306 are color light beams).

In some embodiments, the modulated light beams 306' having different predetermined principal angular directions form a plurality of pixels of the 3D electronic display 300. In some examples, the 3D electronic display 300 may be a so-called 'glasses free' 3D color electronic display (e.g., a multiview, 'holographic' or autostereoscopic display) in which the modulated light beams 306' correspond to pixels associated with different 'views' of the 3D electronic display 300. Modulated light beams 306' are illustrated using dashed line arrows 306' in FIG. 7, while the different light beams 306 prior to modulation are illustrated as solid line arrows, by way of example.

The 3D electronic display 300 illustrated in FIG. 7 comprises a dual-direction optical collimator 310 (abbreviated as 'Dual-Dir. Coll.' in FIG. 7). The dual-direction optical collimator 310 is configured to provide dual-direction collimated light having both vertical collimation and horizontal collimation. In particular, the vertical and horizontal collimation is with respect to a vertical direction (e.g., z-direction) or a vertical plane (e.g., y-z plane) and a horizontal direction (e.g., x-direction) or a horizontal plane (x-y plane) of the dual-direction optical collimator 310. Further, the dual-direction optical collimator 310 is configured to provide the dual-direction collimated light at a non-zero propagation angle relative to the horizontal plane of the dual-direction collimator 310.

In some embodiments, the dual-direction optical collimator 310 is substantially similar to the above-described dual-direction optical collimator 100. In particular, the dual-direction collimator 310 comprises a vertical collimator and a horizontal collimator. The horizontal collimator is located adjacent to an output of the vertical collimator. Further, the vertical collimator may be substantially similar to the vertical collimator 110 and the horizontal collimator may be substantially similar to the horizontal collimator 120 described with respect to the dual-direction optical collimator 100, according to some embodiments.

For example, the vertical collimator of the dual-direction collimator 310 may comprise an optical reflector having a parabolic shape and a tilt angle. The tilt angle may be configured to determine the non-zero propagation angle of the dual-direction collimated light at an output of the dual-direction optical collimator. Further, for example, the horizontal collimator of the dual-direction collimator 310 may comprise an optical reflector having a parabolic shape. The optical reflector of the horizontal collimator may be configured to substantially span an output aperture of the dual-direction optical collimator and to provide the dual-direction collimated light with a substantially uniform distribution across the output aperture, for example. In addition, the dual-direction collimator 310 may comprise vertical and horizontal collimators arranged in various other configurations including sub-reflectors and multiple vertical collimators, e.g., as described above with respect to the vertical collimator 110 and horizontal collimator 120 of the dual-direction optical collimator 100.

As illustrated in FIG. 7, the 3D electronic display 300 further comprises a plate light guide 320. The plate light guide 320 is configured to guide the dual-direction collimated light as a guided light beam at the non-zero propagation angle. In particular, the guided light beam may be guided at the non-zero propagation angle relative to a surface (e.g., one or both of a top surface and a bottom surface) of the plate light guide 320. The surface may be parallel to the horizontal plane in some embodiments. According to some embodiments, the plate light guide 320 may be substantially similar to the plate light guide 220 described above with respect to the backlight 200.

According to various embodiments and as illustrated in FIG. 7, the 3D electronic display 300 further comprises an array of multibeam diffraction gratings 330 located at a surface of the plate light guide 320. According to some embodiments, a multibeam diffraction grating 330 of the array may be substantially similar to the multibeam diffraction grating 240 described above with respect to the backlight 200. In particular, a multibeam diffraction grating 330 of the array is configured to diffractively couple out a portion of the guided light beam as plurality of coupled-out light beams having different principal angular directions and representing the light beams 306. Moreover, the different principal angular directions of light beams 306 coupled out by the multibeam diffraction grating 330 correspond to different 3D views of the 3D electronic display 300, according to various embodiments. In some embodiments, the multibeam diffraction grating 330 comprises a chirped diffraction grating having curved diffractive features. In some embodiments, a chirp of the chirped diffraction grating is a linear chirp.

In some embodiments, the 3D electronic display 300 (e.g., as illustrated in FIG. 7) further comprises a light source 340 configured to provide light to an input of the dual-direction optical collimator 310. In some embodiments, the light source 340 may be substantially similar to the light source 230 of the backlight 200, described above. In particular, the light source 340 may comprise a plurality of different light emitting diodes (LEDs) configured to provide different colors of light (referred to as 'different colored LEDs' for simplicity of discussion). In some embodiments, the different colored LEDs may be offset (e.g., laterally offset) from one another. The offset of the different colored LEDs is configured to provide different, color-specific, non-zero propagation angles of the dual-direction collimated light from the dual-direction optical collimator 310. Further, a different, color-specific, non-zero propagation angle may correspond to each of the different colors of light provided by the light source 340.

In some embodiments (not illustrated), the different colors of light may comprise the colors red, green and blue of a red-green-blue (RGB) color model. Further, the plate light guide 320 may be configured to guide the different colors as light beams at different color-dependent propagation angles within the plate light guide 320. For example, a first guided color light beam (e.g., a red light beam) may be guided at a first color-dependent propagation angle, a second guided color light beam (e.g., a green light beam) may be guided at a second color-dependent propagation angle, and a third guided color light beam (e.g., a blue light beam) may be guided at a third color-dependent propagation angle, according to some embodiments.

As illustrated in FIG. 7, the 3D electronic display 300 may further comprise a light valve array 350. According to various embodiments, the light valve array 350 is configured to modulate the coupled-out light beams 306 of the light beam plurality as the modulated light beams 306' to form or serve as the 3D pixels corresponding to the different 3D views of the 3D electronic display 300. In some embodiments, the light valve array 350 comprises a plurality of liquid crystal light valves. In other embodiments, the light valve array 350 may comprise another light valve including, but not limited to, an electrowetting light valve, an electrophoretic light valves, a combination thereof, or a combination of liquid crystal light valves and another light valve type, for example.

Figure 8:
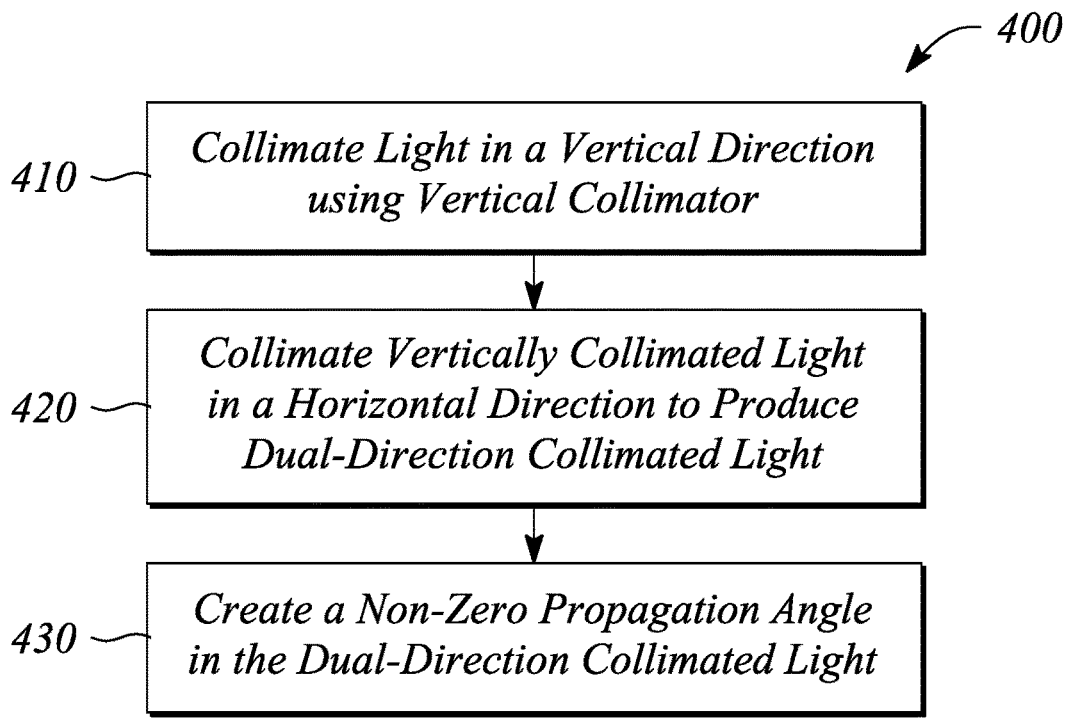
FIG. 8 illustrates a flow chart of a method of dual-direction light collimation in an example, according to an embodiment consistent with the principles described herein.

In accordance with other embodiments of the principles described herein, a method of dual-direction light collimation is provided. FIG. 8 illustrates a flow chart of a method 400 of dual-direction light collimation in an example, according to an embodiment consistent with the principles described herein. As illustrated in FIG. 8, the method 400 of dual-direction light collimation comprises collimating 410 light in a vertical direction using a vertical collimator to provide vertically collimated light. In some embodiments, the vertical collimator is substantially similar to the vertical collimator 110 described above with respect to the dual-direction optical collimator 100. For example, the vertical collimator used in collimating 410 light may comprise an optical reflector having a parabolic shape.

The method 400 of dual-direction light collimation further comprises further collimating 420 the vertically collimated light in a horizontal direction using a horizontal collimator located adjacent to an output of the vertical collimator to produce dual-direction collimated light that is both vertically collimated and horizontally collimated. In some embodiments, the horizontal collimator is substantially similar to the horizontal collimator 120 described above with respect to the dual-direction optical collimator 100. For example, the horizontal collimator used in further collimating 420 the vertically collimated light may comprise another optical reflector having another parabolic shape. In some embodiments, the horizontal collimator optical reflector may substantially span an output aperture of the horizontal collimator to produce a substantially uniform distribution of the dual-direction collimated light across the output aperture.

The method 400 of dual-direction light collimation illustrated in FIG. 8 further comprises creating 430 a non-zero propagation angle in the dual-direction collimated light, wherein the non-zero propagation angle is in a vertical plane corresponding to the vertical direction (or equivalently is an angle relative to a horizontal plane). The non-zero propagation angle may be substantially similar to the non-zero propagation angle described above with respect to the dual-direction optical collimator 100, for example. In particular, in some embodiments the non-zero propagation angle may be provided by a tilt angle of the optical reflector of one or both of the vertical collimator and the horizontal collimator.

Figure 9:
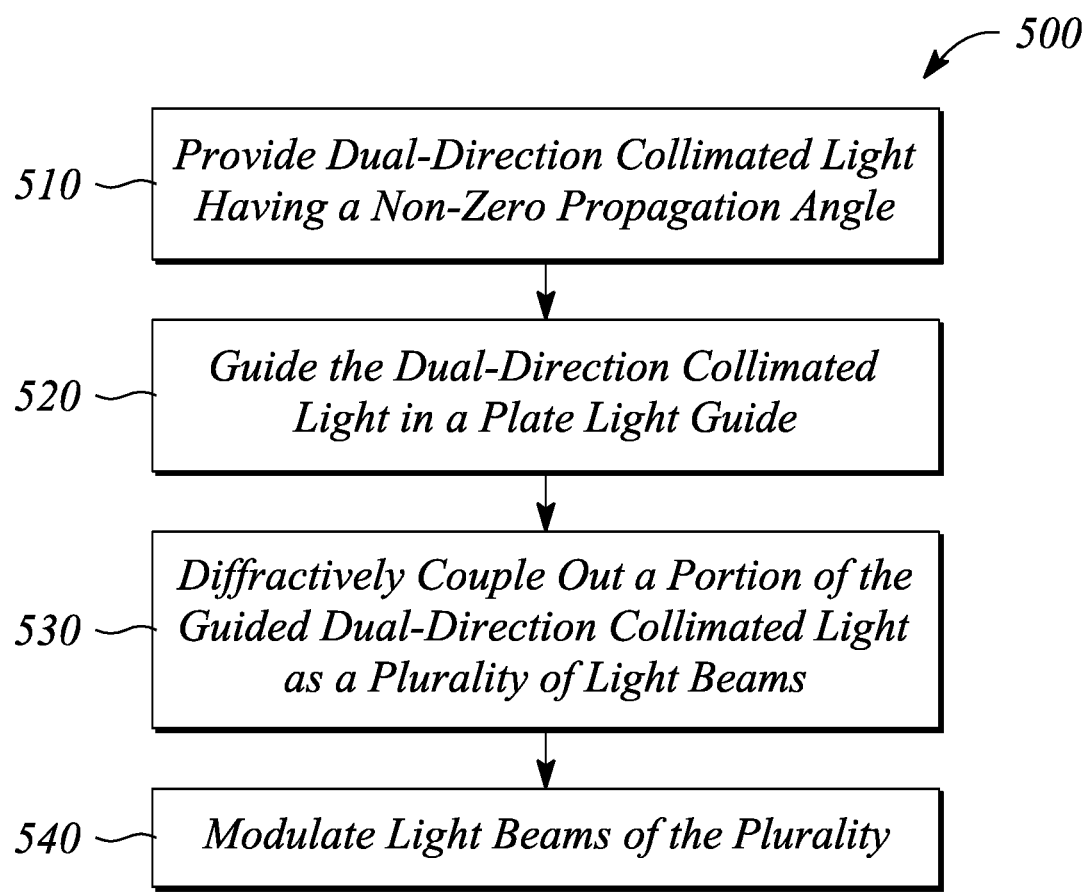
FIG. 9 illustrates a flow chart of a method of three-dimensional (3D) electronic display operation in an example, according to an embodiment consistent with the principles described herein.

In accordance with yet other embodiments of the principles described herein, a method of three-dimensional (3D) electronic display operation is provided. FIG. 9 illustrates a flow chart of a method 500 of 3D electronic display operation in an example, according to an embodiment consistent with the principles described herein. As illustrated in FIG. 9, the method 500 of 3D electronic display operation comprises providing 510 dual-direction collimated light having a non-zero propagation angle. According to various embodiments, the dual-direction collimated light may be provided 510 using a dual-direction collimator. The dual-direction collimator may be substantially similar to the dual-direction optical collimator 100 described above. In some embodiments, the dual-direction collimated light may be provided 510 according to the method 400 of dual-direction light collimation, described above. For example, providing 510 dual-direction collimated light may employ a vertical collimator followed by a horizontal collimator at an output of the vertical collimator.

The method 500 of 3D electronic display operation further comprises guiding 520 the dual-direction collimated light in a plate light guide. In particular, the dual-direction collimated light is guided 520 at the non-zero propagation angle within the plate light guide. According to some embodiments, the plate light guide may be substantially similar to the plate light guide 220 of the backlight 200, as described above.

The method 500 of 3D electronic display operation of FIG. 9 further comprises diffractively coupling out 530 a portion of the guided dual-direction collimated light using a multibeam diffraction grating to produce a plurality of light beams. According to some embodiments, the multibeam diffraction grating is located at a surface of the plate light guide. According to various embodiments, diffractively coupling out 530 the guided dual-direction collimated light portion is configured to provide the plurality of light beams directed away from the plate light guide in a plurality of different principal angular directions. In particular, the plurality of different principal angular directions corresponds to directions of different 3D views of a 3D electronic display. According to some embodiments, the multibeam diffraction grating is substantially similar to the multibeam diffraction grating 240 and the diffractively coupled-out 530 light beams of the light beam plurality correspond to the light beams 206, described above with respect to the backlight 200 or the light beams 306 of the 3D electronic display 300.

According to various embodiments, the method 500 of 3D electronic display operation illustrated in FIG. 9 further comprises modulating 540 light beams of the plurality of light beams using an array of light valves. The modulated 540 light beams form 3D pixels of the 3D electronic display in the 3D view directions, according to various embodiments. In some embodiments, the array of light valves may be substantially similar to the light valve array 350 described above with respect to the 3D electronic display 300.

In some embodiments (not illustrated), the method 500 of 3D electronic display operation further comprises providing light to be dual-direction collimated. For example, the light may be non-collimated light provided to a dual-direction optical collimator, such as the dual-direction collimator that may be used in providing 510 dual-direction collimated light. The light may be provided using a light source at an input of the vertical collimator, for example. Further, the light source may be substantially similar to the light source 230 described above with respect to the backlight 200, in some embodiments.

Thus, there have been described examples of a dual-direction optical collimator, a backlight and a 3D electronic display that employ a dual-direction optical collimator, a method of dual-direction collimation and a method of 3D electronic display operation that employs dual-direction collimation. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A dual-direction optical collimator comprising:
   a vertical collimator configured to collimate light in a vertical direction;
   a horizontal collimator configured to collimate light in a horizontal direction substantially orthogonal to the vertical direction, the horizontal collimator being located adjacent to an output of the vertical collimator to horizontally collimate vertically collimated light from the vertical collimator to provide dual-direction collimated light at an output of the dual-direction optical collimator; and
   a plate light guide coupled to the output of the dual-direction optical collimator, the plate light guide being configured to receive and to guide the dual-direction collimated light in the horizontal direction,
   wherein the dual-direction optical collimator is configured to provide the dual-direction collimated light at a non-zero propagation angle relative to a horizontal plane of the plate light guide corresponding to the horizontal direction, the dual-direction collimated light to be guided by the plate light guide at the non-zero propagation angle.

2. The dual-direction optical collimator of claim 1, wherein the vertical collimator comprises an optical reflector having a parabolic shape and a tilt angle, the tilt angle being configured to provide the non-zero propagation angle of the dual-direction collimated light.

3. The dual-direction optical collimator of claim 1, wherein the horizontal collimator comprises an optical reflector having a parabolic shape, the optical reflector being configured to substantially span an output aperture of the dual-direction optical collimator, the dual-direction collimated light to have a substantially uniform distribution across the output aperture.

4. The dual-direction optical collimator of claim 1, wherein the horizontal collimator comprises an optical reflector having a plurality of sub-reflectors configured in combination to substantially span an output aperture of the dual-direction optical collimator, each sub-reflector comprising a parabolic-shaped reflective surface.

5. The dual-direction optical collimator of claim 4, wherein the optical reflector is a Fresnel reflector.

6. The dual-direction optical collimator of claim 4, wherein a first sub-reflector of the plurality of sub-reflectors is configured to receive the vertically collimated light from a first vertical collimator located at a first edge of the horizontal collimator, a second sub-reflector of the plurality of sub-reflectors being configured to receive the vertically collimated light from a second vertical collimator located at a second edge of the horizontal collimator, the second edge being opposite the first edge in the horizontal plane corresponding to the horizontal direction.

7. The dual-direction optical collimator of claim 1, wherein the vertical collimator is integral to and comprises a material of the horizontal collimator.

8. A backlight comprising the dual-direction optical collimator of claim 1,
   wherein the plate light guide is further configured to emit a portion of the guided, dual-direction collimated light from a surface of the plate light guide.

9. The backlight of claim 8, further comprising a light source configured to provide light to the dual-direction optical collimator, the light source being located adjacent to the vertical collimator and being configured to provide the light to an input of the vertical collimator.

10. The backlight of claim 9, wherein the light source comprises a plurality of different optical sources configured to provide different colors of light, the different optical sources being offset from one another, wherein the offset of the different optical sources is configured to provide different, color-specific, non-zero propagation angles of the dual-direction collimated light corresponding to each of the different colors of light.

11. The backlight of claim 8, further comprising a multibeam diffraction grating configured to diffractively couple out a portion of the guided, dual-direction collimated light from the plate light guide as a plurality of light beams emitted from the plate light guide surface, a light beam of the light beam plurality having a principal angular direction different from principal angular directions of other light beams of the light beam plurality.

12. A three-dimensional (3D) electronic display comprising the backlight of claim 11, the 3D electronic display further comprising:
   a light valve to modulate a light beam of the light beam plurality, the light valve being adjacent to the multibeam diffraction grating,
   wherein the principal angular direction of the light beam corresponds to a view direction of the 3D electronic display, the modulated light beam representing a pixel of the 3D electronic display in the view direction.

13. A three-dimensional (3D) electronic display comprising:
   a dual-direction optical collimator comprising a vertical collimator and a horizontal collimator located adjacent to an output of the vertical collimator, the dual-direction optical collimator being configured to provide dual-direction collimated light having both vertical collimation and horizontal collimation at a non-zero propagation angle relative to a horizontal plane;
   a plate light guide configured to guide the dual-direction collimated light as a guided light beam at the non-zero propagation angle; and
   an array of multibeam diffraction gratings at a surface of the plate light guide, a multibeam diffraction grating of the array being configured to diffractively couple out a portion of the guided light beam as a plurality of coupled-out light beams having different principal angular directions corresponding to directions of different 3D views of the 3D electronic display.

14. The 3D electronic display of claim 13, wherein the vertical collimator comprises an optical reflector having a parabolic shape and a tilt angle, the tilt angle being configured to determine the non-zero propagation angle of the dual-direction collimated light at an output of the dual-direction optical collimator.

15. The 3D electronic display of claim 13, wherein the horizontal collimator comprises an optical reflector having a parabolic shape, the optical reflector of the horizontal collimator being configured to substantially span an output aperture of the dual-direction optical collimator and to provide the dual-direction collimated light with a substantially uniform distribution across the output aperture.

16. The 3D electronic display of claim 13, wherein the horizontal collimator has a first edge and a second edge that is opposite the first edge, the horizontal collimator comprising an optical reflector that comprises a plurality of sub-reflectors configured in combination to substantially span an output aperture of the dual-direction optical collimator, a first sub-reflector of the sub-reflector plurality being configured to receive vertically collimated light from a first vertical collimator at the first edge of the horizontal collimator, a second sub-reflector of the sub-reflector plurality being configured to receive vertically collimated light from a second vertical collimator at the second edge of the horizontal collimator.

17. The 3D electronic display of claim 13, wherein the array of multibeam diffraction gratings comprises a chirped diffraction grating having curved diffractive features.

18. The 3D electronic display of claim 17, wherein the chirped diffraction grating is a linear chirped diffraction grating.

19. The 3D electronic display of claim 13, further comprising:
   a light source configured to provide light to an input of the dual-direction optical collimator; and
   a light valve array configured to selectively modulate the coupled-out light beams of the plurality as 3D pixels corresponding to the different 3D views of the 3D electronic display.

20. The 3D electronic display of claim 19, wherein the light valve array comprises a plurality of liquid crystal light valves.

21. The 3D electronic display of claim 19, wherein the light source comprises a plurality of different light emitting diodes (LEDs) configured to provide different colors of light, the different LEDs being offset from one another, wherein the offset of the different LEDs is configured to provide different, color-specific, non-zero propagation angles of the dual-direction collimated light, a different, color-specific, non-zero propagation angle corresponding to each of the different colors of light.

22. A method of dual-direction light collimation, the method comprising:
   collimating light in a vertical direction using a vertical collimator to provide vertically collimated light;
   further collimating the vertically collimated light in a horizontal direction using a horizontal collimator located adjacent to an output of the vertical collimator to produce dual-direction collimated light that is both vertically collimated and horizontally collimated;
   creating a non-zero propagation angle in the dual-direction collimated light, the non-zero propagation angle being in a vertical plane corresponding to the vertical direction; and
   guiding the dual-direction collimated light in a plate light guide at the non-zero propagation angle.

23. The method of dual-direction light collimation of claim 22, wherein the vertical collimator comprises an optical reflector having a parabolic shape and a tilt angle, the tilt angle providing the non-zero propagation angle of the dual-direction collimated light, and wherein the horizontal collimator comprises another optical reflector having another parabolic shape and spanning an output aperture of the horizontal collimator to produce a uniform distribution of the dual-direction collimated light across the output aperture.

24. A method of three-dimensional (3D) electronic display operation comprising the method of dual-direction light collimation of claim 22, the method of 3D electronic display operation further comprising:
   diffractively coupling out a portion of the guided dual-direction collimated light using a multibeam diffraction grating at a surface of the plate light guide to produce a plurality of light beams directed away from the plate light guide in a plurality of different principal angular directions corresponding to directions of different 3D views of a 3D electronic display; and
   modulating light beams of the plurality of light beams using an array of light valves, the modulated light beams forming 3D pixels of the 3D electronic display in the 3D view directions.

* * * * *